G. MACHLET.

Doughnut Molds.

No. 137,142.  Patented March 25, 1873.

Witnesses:
E. Wolff
O. Sedgwick

Inventor:
G. Machlet
Per Munn &c.
Attorneys.

UNITED STATES PATENT OFFICE.

GEORG MACHLET, OF NEWARK, NEW JERSEY.

IMPROVEMENT IN DOUGHNUT-MOLDS.

Specification forming part of Letters Patent No. 137,142, dated March 25, 1873.

*To all whom it may concern:*

Figure 1:
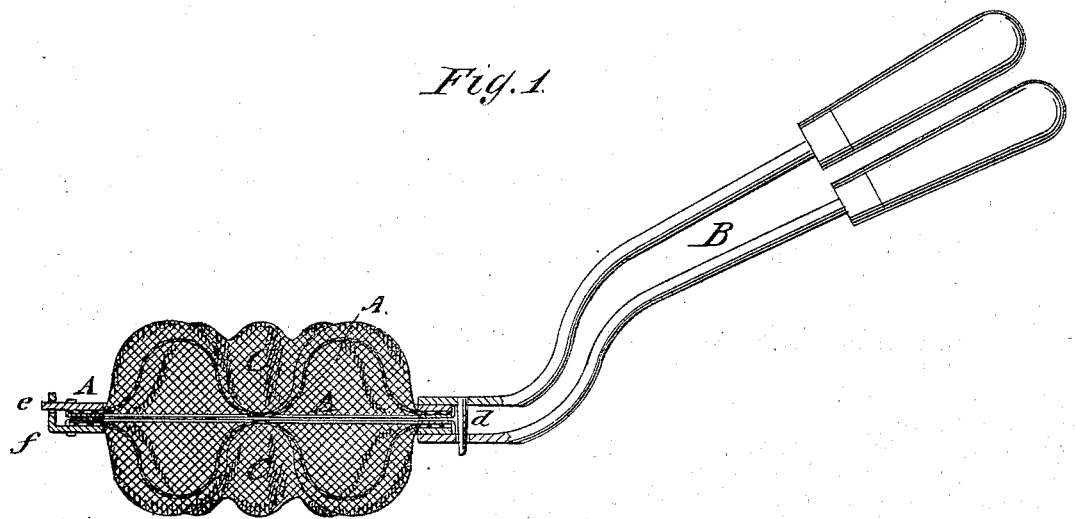
Figure 2:
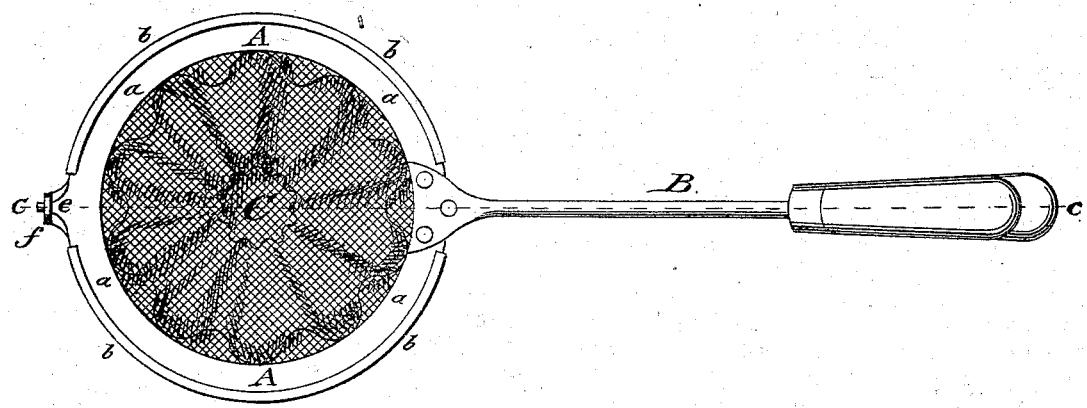

Be it known that I, GEORG MACHLET, of Newark, in the county of Essex and State of New Jersey, have invented a new and Improved Doughnut-Mold, of which the following is a specification:

In the accompanying drawing, Figure 1 represents a vertical longitudinal section of my invention on line $cc$, Fig. 2; and Fig. 2, a plan view of the same.

Similar letters of reference indicate corresponding parts.

The object of my invention is to construct a doughnut-mold, by the use of which any desired shape may be given to the doughnuts, and the unsightly irregular form of the same be changed to a regular one, and fancy forms be produced, such as fishes, stars, rings, or others. My invention consists in two rims with handles, which support the two halves of the mold, formed of suitable wire-gauze. The molds are connected by guide-pins when used for baking the nuts.

In the drawing, A represents the rims of the molds, having suitable handle-pieces B of required length, riveted, stamped, or otherwise connected with them. Each rim A is formed of two rings of sheet metal, the lower, $b$, being clasped around the upper ring $a$, so as to give a rigid connection. The mold C, of wire-gauze, and any desired shape or form to suit the varied taste of the public, is held tightly between rims at $b$, and allows the expansion of the dough to the full extent when boiling in the lard. The rim A of the upper mold has a projecting handle-pin, $d$, fitting into an aperture of the rim of the lower mold, and a projecting pin, $e$, fitting into a perforated lug, $f$, establishing thereby the connection of the molds on their rims A.

The dough, when ready for baking, is cut out into a size and shape corresponding to the molds used; then placed into the lower mold, the upper is secured to it, and the whole held into the boiling lard till the dough has extended sufficiently to fill the mold; the upper half is then detached, and the nut thrown out and boiled till well done. It is then taken out of the lard and allowed to cool, when it represents the exact shape of the mold used.

Having thus described my invention, I claim as new and desire to secure by Letters Patent—

The doughnut-mold, consisting of two half-molds, C, of wire-gauze placed within rims A, having pins $d\,e$ and lug $f$ and handles B, substantially as and for the purpose described.

GG. MACHLET.

Witnesses:
PAUL GOEPEL,
T. B. MOSHER.